Patented Dec. 20, 1927.

1,653,502

UNITED STATES PATENT OFFICE.

HEINRICH GÜNZLER AND WALDEMAR ZIESER, OF ELBERFELD, GERMANY, ASSIGNORS TO I. G. FARBENINDUSTRIE AKTIENGESELLSCHAFT, OF FRANKFORT-ON-THE-MAIN, GERMANY.

VULCANIZATION OF RUBBER AND THE PRODUCT THEREOF.

No Drawing. Application filed April 12, 1927, Serial No. 183,229, and in Germany May 21, 1926.

The present invention relates to a new and improved process of vulcanizing natural or artificial rubber in which a small amount of the amide of formic acid is employed as a vulcanization accelerator with or without a substance capable of activating the amide of formic acid, such as, for example zinc oxide. Zinc oxide has been found to be very effective for activating the amide of formic acid.

The amide of formic acid possesses the advantage that it is completely non-poisonous and that it is free from caustic or other irritating action. The products of the vulcanization obtained with the aid of this compound have an excellent elasticity.

The vulcanizing process may be carried out by any of the methods now well-known in the art. The following examples serve to illustrate the invention. However, it is to be understood that these examples are merely illustrative and that the invention is not limited to the use of the particular materials, proportions or method specified.

100 parts by weight of raw rubber (smoked sheets), 10 parts by weight of zinc white, 5 parts by weight of sulphur and 1.5 parts by weight of formamide are subjected to the vulcanization process for 50 minutes at 140° C. A vulcanized product is obtained, which possesses a high degree of elasticity.

100 parts by weight of raw rubber (smoked sheets), 10 parts by weight of zinc white, 6 parts by weight of sulphur and 1 part by weight of formamide are subjected to the vulcanization process for 60 minutes at 140° C. The vulcanized product possesses very good physical properties.

I claim:

1. Process which comprises vulcanizing rubber with which a small amount of the amide of formic acid has been incorporated.

2. Process which comprises vulcanizing rubber with which a small amount of the amide of formic acid and zinc oxide have been incorporated.

3. As a new article of manufacture, a vulcanized rubber combined before vulcanization with a small amount of the amide of formic acid.

4. As a new article of manufacture, a vulcanized rubber combined before vulcanization with a small amount of the amide of formic acid and zinc oxide.

In testimony whereof we have hereunto set our hands.

HEINRICH GÜNZLER.
WALDEMAR ZIESER.